A. F. DIXON.
COIN COLLECTOR.
APPLICATION FILED JAN. 7, 1909.

1,040,526.

Patented Oct. 8, 1912.
6 SHEETS—SHEET 1.

Witnesses:
Ralph G. Johansen.
Irving MacDonald

Inventor.
Amos F. Dixon.
By D. C. Tanner
Atty.

A. F. DIXON.
COIN COLLECTOR.
APPLICATION FILED JAN. 7, 1909.

1,040,526.

Patented Oct. 8, 1912.

6 SHEETS—SHEET 3.

Witnesses:
Ralph G. Johansen
Irving MacDonald

Inventor:
Amos F. Dixon
By L. C. Tanner
Atty.

A. F. DIXON.
COIN COLLECTOR.
APPLICATION FILED JAN. 7, 1909.
1,040,526.
Patented Oct. 8, 1912.
6 SHEETS—SHEET 4.
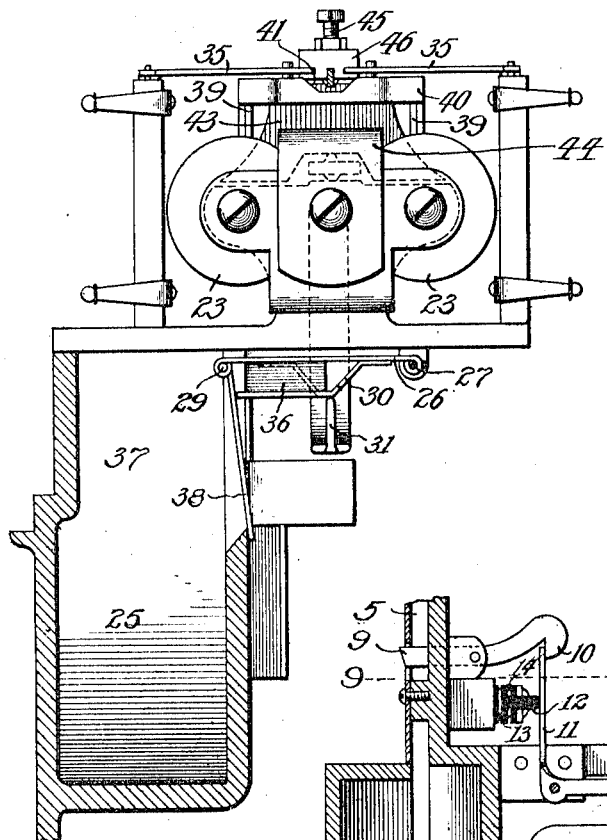
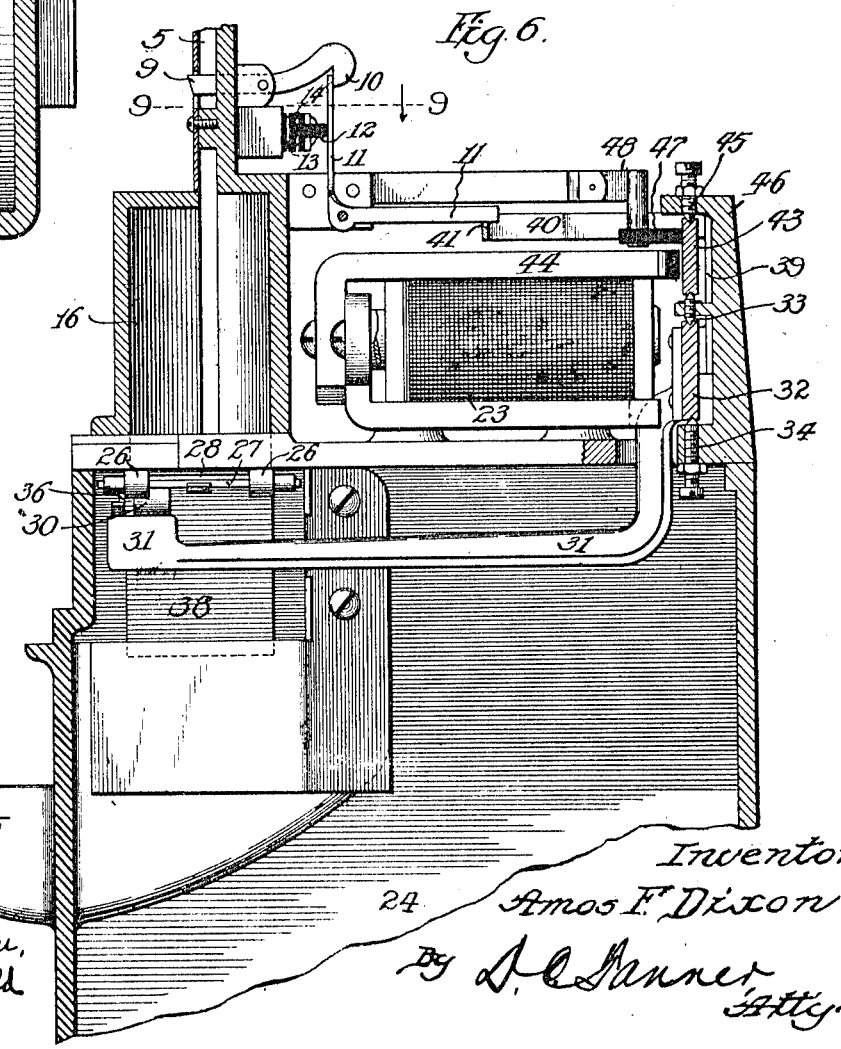
Witnesses
Ralph Y. Johansen,
Irving McDonald
Inventor:
Amos F. Dixon
By S. C. Tanner
Atty.

A. F. DIXON.
COIN COLLECTOR.
APPLICATION FILED JAN. 7, 1909.

1,040,526.

Patented Oct. 8, 1912.
6 SHEETS—SHEET 5.

Witnesses:
Ralph G. Johansen.
Irving MacDonald

Inventor:
Amos F. Dixon,
By J. C. Kenner
Atty.

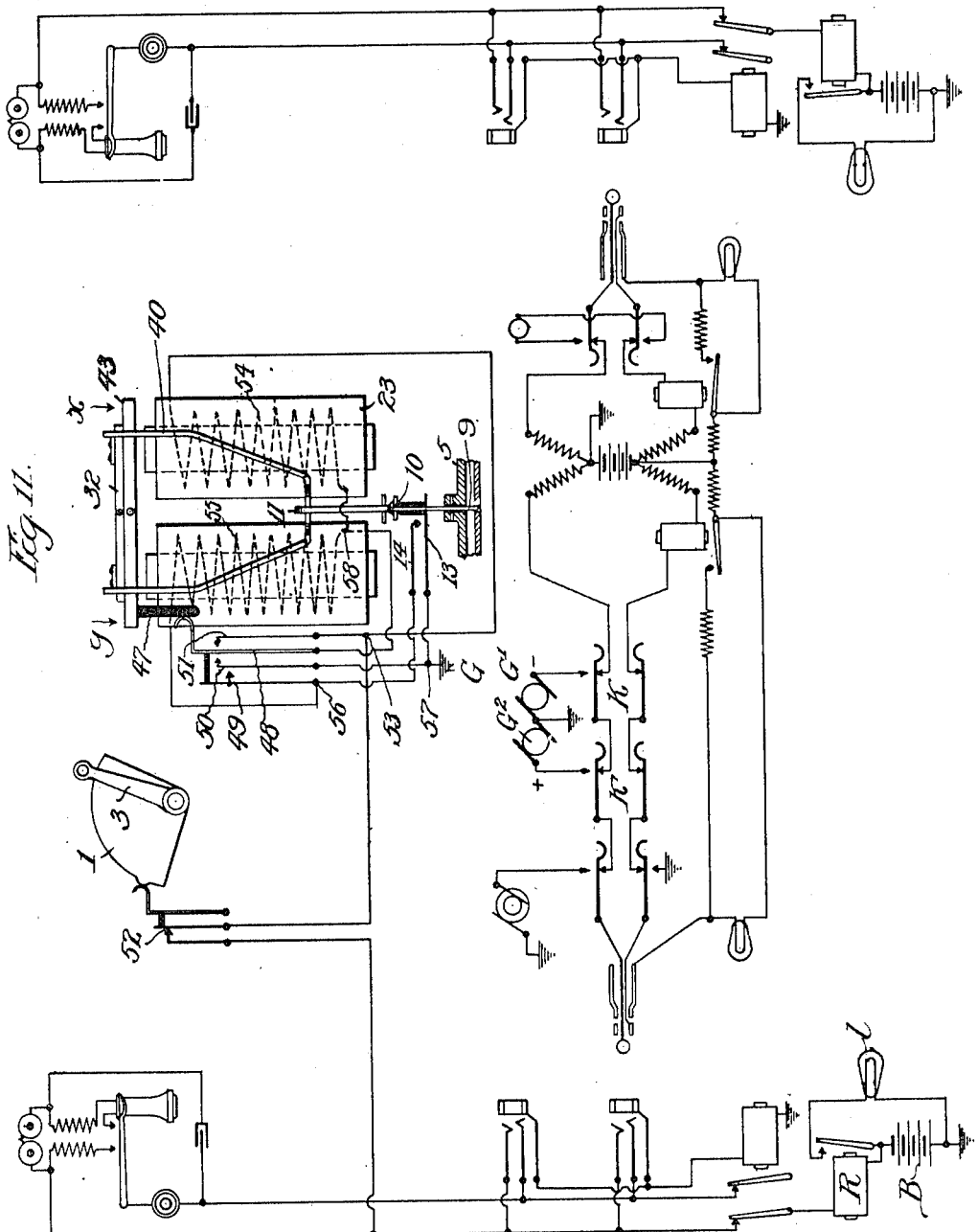

UNITED STATES PATENT OFFICE.

AMOS F. DIXON, OF NEW YORK, N. Y., ASSIGNOR TO WESTERN ELECTRIC COMPANY, OF CHICAGO, ILLINOIS, A CORPORATION OF ILLINOIS.

COIN-COLLECTOR.

1,040,526.   Specification of Letters Patent.   Patented Oct. 8, 1912.

Application filed January 7, 1909. Serial No. 471,145.

*To all whom it may concern:*

Be it known that I, AMOS F. DIXON, a citizen of the United States, residing at New York, in the county of New York and State of New York, have invented a certain new and useful Improvement in Coin-Collectors, of which the following is a full, clear, concise, and exact description.

My invention relates to a coin collector for telephone pay stations, and its object is to provide apparatus of increased efficiency adapted for use either as a local or a toll coin-collector.

My invention is designed to improve in certain details of structure and operation on the type of apparatus shown in Patent No. 846,500, issued March 12, 1907, to Frank R. McBerty and Howard B. Holmes, and No. 867,707, issued October 8, 1907, to Edward B. Craft.

The principal feature of my invention herein claimed relates to an electromagnet and a circuit arrangement therefor, adapted for use in connection with devices of the kind above referred to, whereby the charging of the call is controlled in an efficient and reliable manner.

My invention will be fully understood from the following specification taken in connection with the accompanying drawings, in which the preferred embodiment of said invention is set forth.

Figure 1:
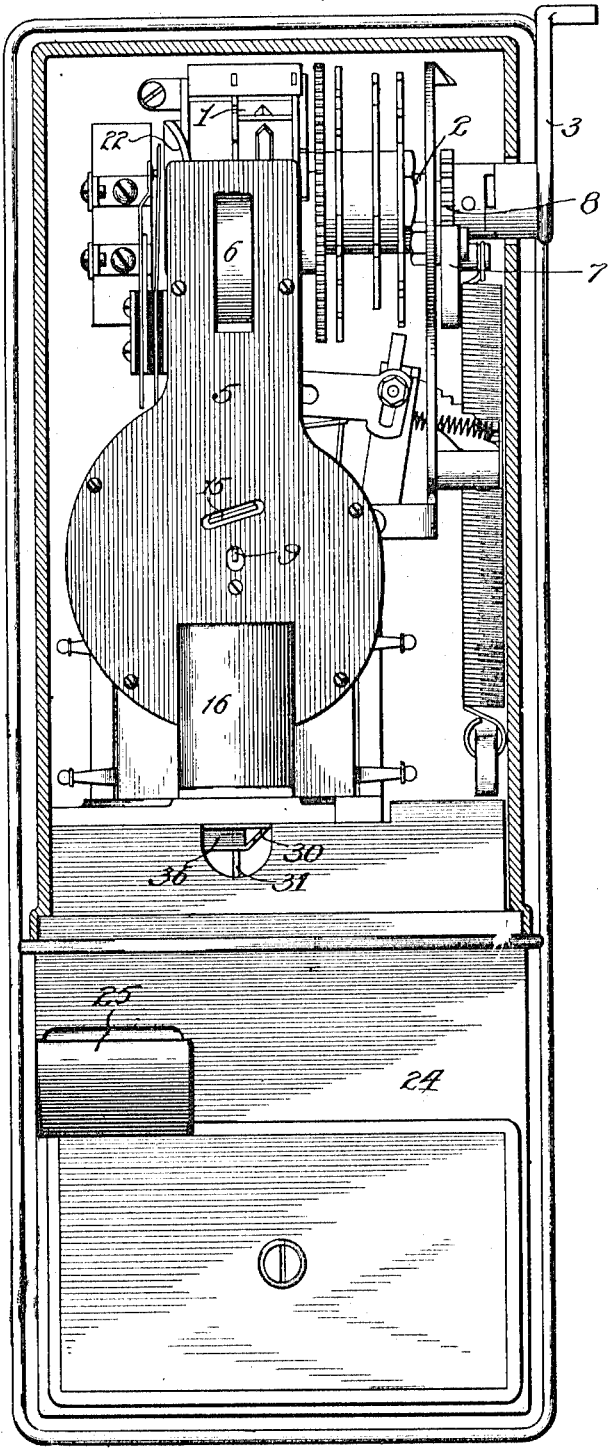
Figure 2:
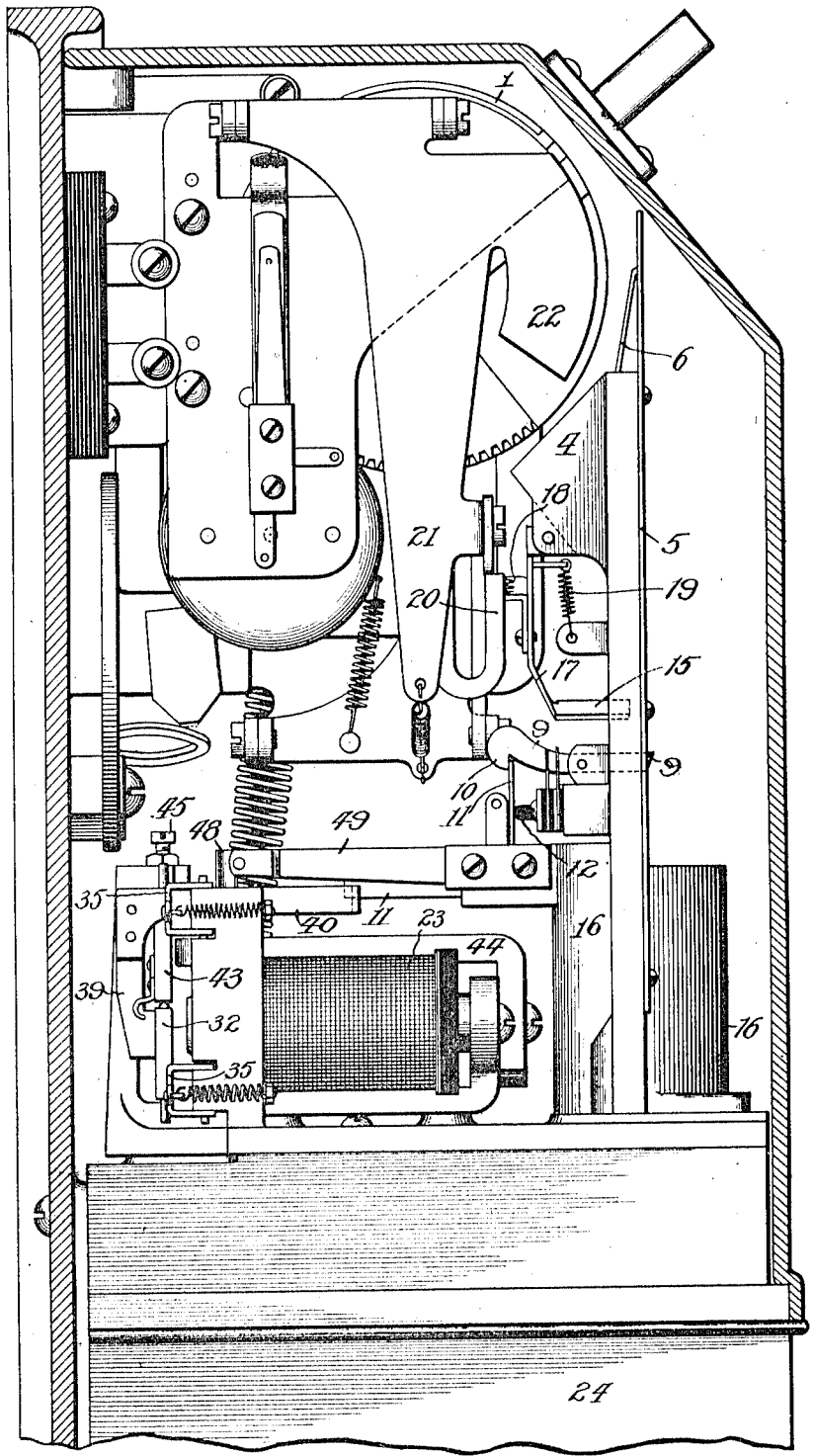
Figure 3:
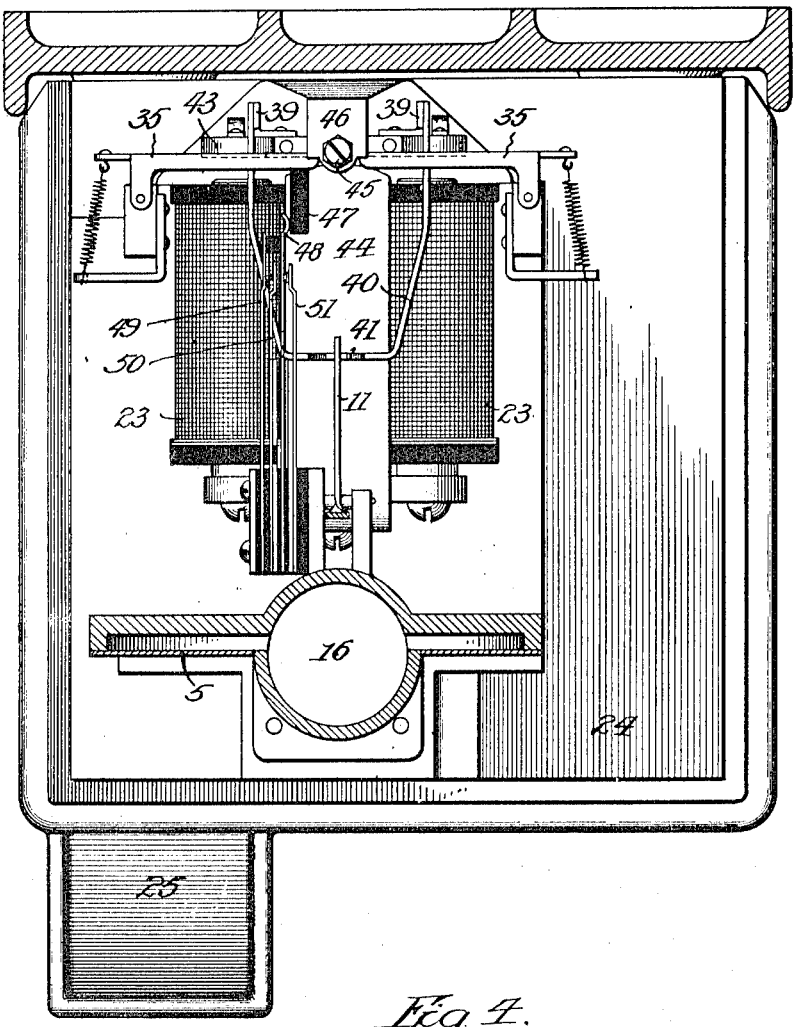
Figure 4:
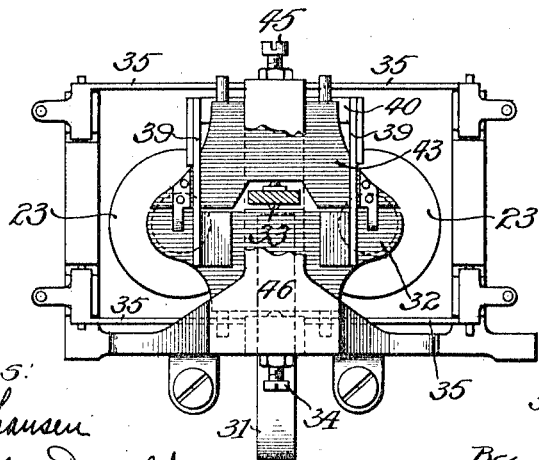
Figure 7:
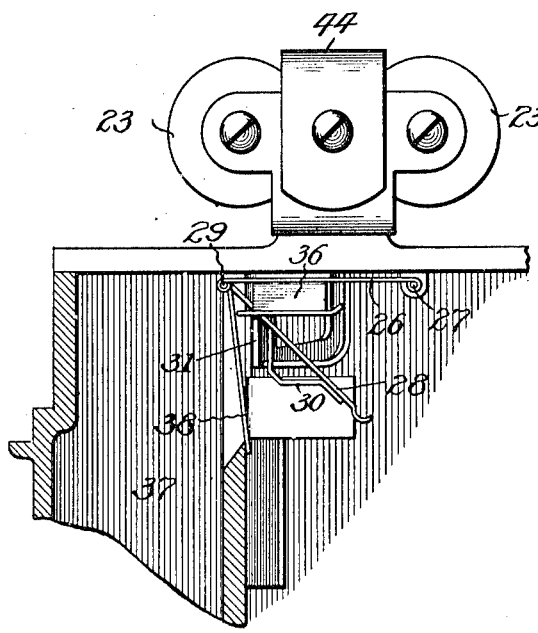
Figure 8:
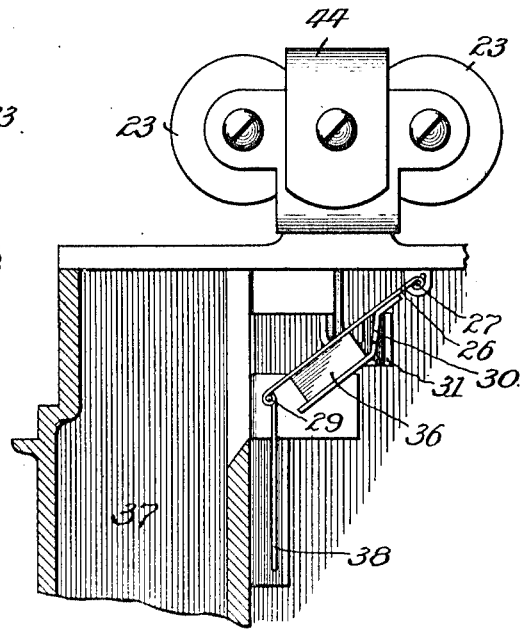
Figure 9:
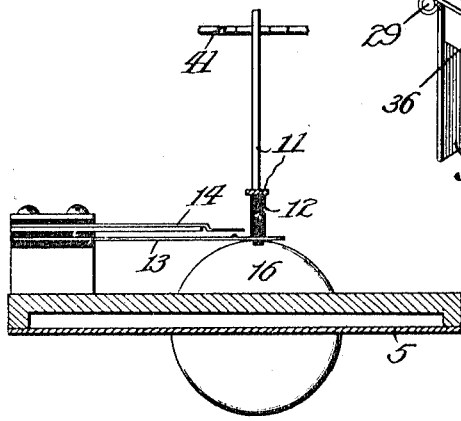
Figure 10:
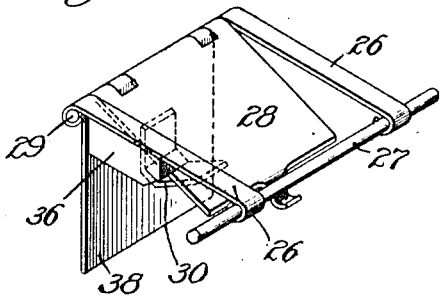

Figures 1 and 2 are front and side elevations, respectively, of the coin collector of my invention, with the cover in section; Fig. 3 is a horizontal sectional view directly above the coin controlling electromagnet, showing said electromagnet in plan; Fig. 4 is a detail rear elevation, with parts broken away, of the coin controlling magnet; Fig. 5 is a detail front elevation of the coin controlling magnet, with the coin refunding passage, above which it is mounted, in section; Fig. 6 is a central vertical section through the mounting plate and the coin box of the coin collector, portions being shown in side elevation; Figs. 7 and 8 are detailed views, partly in section and partly in elevation, showing the door of the coin box in depositing and refunding positions, respectively; Fig. 9 is a section on the line 9—9 of Fig. 6; Fig. 10 is a detail perspective view of the door of the coin box; and Fig. 11 is a diagram of the circuits and apparatus employed.

Similar reference characters are used to designate similar parts wherever shown.

The mechanism shown at the upper portion of Figs. 1 and 2 is of well known construction, being substantially identical with that shown and described in the hereinbefore mentioned patents, and hence a detailed description of the same is unnecessary. The temporary coin carrier 1 is mounted upon a rocking shaft 2, which is adapted to be actuated through the medium of the operating handle 3 to move the coin carrier forward, so that a coin held in said carrier will be dropped into the mouth 4 of the coin chute 5. The front wall of the coin chute is extended above the mouth 4, and is provided with an inwardly curved tongue 6 which prevents the coin from being released until the carrier has been drawn down sufficiently to release the dog 7 from the ratchet 8, thus preventing the deposit of the coin before the coin-carrying mechanism is in position to return to its initial position.

Below the mouth 4 of the coin chute 5 is a lever 9, centrally pivoted at the rear of the coin chute (see particularly Figs. 2 and 6). The forward end of the lever extends through a slot in the walls of the coin chute into the coin passage. The rear end of the lever 9 is provided with a dog 10 normally engaging the upper end of a bell-crank lever 11, and holding the same in position to press against the insulating stud 12 of the contact spring 13 and thus hold said spring out of contact with the spring 14 (see Fig. 9). When the horizontally extending arm of the lever 11 is raised in a manner hereinafter described, thus moving forward the vertically extending arm of said lever, the weight of the rear end of the lever 9 causes said end to fall by gravity, and the dog 10 engages with the upper end of the lever 11, retaining said lever in position to hold open the contact springs 13 and 14, as above described.

The fall of a coin from the carrier 1 upon the lever 9 is normally blocked by an obliquely disposed stop or guide 15, the forward end of which projects into the coin chute above the lever 9. When said stop is interposed in the coin chute a coin released from the carrier 1 will be deflected by the stop and will pass into the cup 16 without contacting with the lever 9.

When the stop 15 is withdrawn in the manner hereinafter described, a coin released from the carrier 1 will in its fall strike the forward end of the lever 9 and depress the same, thus raising the dog 10 to unlatch the lever 11, thereby permitting the tension of the spring 13 to move said spring into contact with the spring 14. The dog 10 does not resume its locking engagement with the lever 11 until said lever is tilted by the operation of depositing or refunding the coin from the coin box, as hereinafter described, and hence contact springs 13, 14 meanwhile remain closed. Said contact springs 13, 14, control the usual line signaling circuit, and their closure causes the operation of a signal which indicates to the central office operator, in a manner well understood, that a connection is desired. If a toll connection is sought, the subscriber is informed by the operator as to the additional amount to be deposited in payment for such service. It is immaterial what denomination of coins, within the limits for which the coin box is adapted, are used in payment of the toll.

The operation of the toll signaling mechanism and means by which the stop 15 is withdrawn from the coin chute are substantially the same as that described in the patents hereinbefore referred to, and hence a brief description thereof will suffice. Said stop 15 forms the free end of a bent lever 17, which is pivoted at its upper end. The lever 17 carries a cam plate 18, which projects rearwardly from the same. A spring 19 tends to operate the lever 17 so as to withdraw the stop 15, but such movement of the lever is normally blocked by the engagement of the plate 18 with the extension 20 of the caliper lever 21. The coin carrier 1 has an opening in one of its side walls through which a coin held in said carrier may project. During the advance movement of said carrier, said coin engages the curved arm 22 of the caliper lever 21, and moves said lever laterally to an extent depending upon the diameter of the coin. A coin held in the carrier is not released therefrom until it has passed below the arm 22, that is, not until the caliper lever 21 has been moved to the utmost extent that a coin of such diameter will operate the same. As the lever 21 is moved to the left one or more notches or depressions on the face of the plate 18 permit said plate and the lever 17 to spring backwardly, when the extension 20 of the lever 21 is moved to one of said notches, thus withdrawing the stop 15 from the coin chute. If the coin is of such denomination as will finally set the lever 21 in a position that will permit such withdrawal of the stop 15, the coin will fall from the carrier upon the lever 9 and operate the same in the manner hereinbefore described. Coins of a diameter not provided for by one of the notches on the plate 18 will not so set the lever 21, and hence said coins will be deflected into the cup 16 without contacting with the lever 9.

The cup 16, constituting a receptacle into which all coins are first temporarily deposited after leaving the carrier 1, has a bottom adapted to be tilted by an electromagnet 23 in one or the other direction, thereby depositing the coins in the cash box 24 or in the refund tray 25, as the case may be. The bottom of the cup 16 constitutes a coin trap and comprises a frame 26, (see particularly Figs. 7, 8 and 10) hinged at one side upon a pivot 27, provided with a gate 28 hinged upon the pivot 29 upon the side of the frame opposite the pivot 27. The under side of the gate 28 is provided with a downwardly projecting V-shaped lug 30, and the adjacent portion of the frame 26 is provided with a downwardly extending rectangular lug 36, which lugs normally rest upon the end of an arm 31, fixed to the armature 32 of the electromagnet 23, said arm extending underneath the bottom of the cup 16.

When the lugs 30 and 36 rest upon the arm 31, as shown in Figs. 5 and 6, the coin trap is closed so as to hold the coins in the cup. The armature 32 is centrally pivoted upon vertical pivots 33, 34, and is normally held in its unoperated position by centralizing spring-pressed levers 35, 35, of the type commonly employed for such purpose. When the armature is tilted in either direction it carries with it the arm 31 which is thereby withdrawn from beneath the lug 30. When the arm 31 is moved into the position shown in Fig. 7 the end thereof is moved from beneath the lug 30, but still remains underneath the lug 36, thereby supporting the frame 26 but permitting the gate 28 to drop down, thus depositing the coins in the cash box. When the armature is tilted in the opposite direction the arm 31 is moved from beneath both the lug 30 and the lug 36, as shown in Fig. 8, and the coin trap swings upon the hinge 27, thereby directing the coins into the refund chute 37 leading to the refund tray 25.

A downwardly hanging apron 38 pivoted upon the pin 29 constitutes a barrier in the opening leading to the refund chute 37, when the bottom of the cup is in its closed position, which barrier prevents the unwarranted insertion of an implement through the coin chute to operate the coin trap.

The armature 32 is provided upon its opposite sides with upwardly extending posts 39 at the upper end of which is secured the ends of a horizontally disposed loop 40. The middle portion of said loop is provided upon its upper surface with a groove 41 in which, slightly above the bottom thereof, the end of the horizontally extending arm of the bell crank lever 11 normally lies (see particularly Figs. 3 and 6). When the dog 10 is tripped by a coin falling on the lever 9 the horizontal end of the bell-crank lever 11 falls to the bottom of the groove 41 and the vertical end of said lever is drawn backward in such position that it is not latched by the dog 10. The pressure of the lever 11 being thus removed from the stud 12, the spring 13 closes contact with the spring 14, as hereinbefore described. The contacts controlled by the springs 13, 14, remain closed until the armature 32 is subsequently tilted. When said armature is tilted in either direction the lever 11 rides out of the groove 41 and the horizontal end thereof is elevated, thus tilting forward the vertical end so that the dog 10 drops back of the same and holds the lever 11 in the position shown in Fig. 6. In this latter or normal position the pressure of the lever 11 upon the stud 12 opens the contacts of springs 13, 14.

In addition to the armature 32, the function of which has been described, the electromagnet 23 is provided with an additional armature 43 mounted in close proximity to the end of a permanent magnet 44. In short, the electromagnet is provided with an upper armature 43 and a lower armature 32, the upper armature 43 being directly under the influence of the permanent magnet 44, and being polarized thereby, while the lower armature is so removed from the permanent magnet as to be practically free from such polarizing influence. The armature 43 is centrally pivoted upon the vertical pivots 33, 45. The pivots of both armatures are carried upon horizontal flanges extending from a standard 46.

The armature 43 is provided with a stud 47 of insulating material which bears against the end of a contact spring 48. The actuation of the spring 48, due to the tilting of the armature 43, controls the closure of the contacts carried by the springs 49, 50 and 51. The upper armature 43 is so arranged that upon being tilted it operates to close a contact, thereby short circuiting one or the other coil of the electromagnet 23 and causing practically all of the flux to pass through the core inclosed by the active coil. The flux thus developed produces a pull upon one side of the non-polarized lower armature 32, and results in the operation of the same. It has been found that the ordinary polarized magnet develops very little power during the initial movement, but with the electromagnet of my invention a coin controlling magnet is provided which is extremely efficient in its capability of exerting in starting the required pull upon the armature which controls the final disposition of the coins.

The operation of the apparatus may now be readily understood by considering the apparatus hereinbefore described in connection with the circuit arrangement which I preferably employ, said circuit arrangement being shown in Fig. 11.

The subscriber desiring a connection, either local or toll, deposits a coin of the proper denomination into the opening in the casing leading to the carrier 1, and then pulls down the lever 3, thereby tilting the carrier into position to deposit the coin in the coin chute 5. The initial movement of the carrier 1 causes contact 52 to open, said contact remaining open until the return of the carrier to its normal initial position. The opening of the contact 52 is brought about for the purpose of preventing a fraudulent operation of the mechanism, as fully explained in the hereinbefore mentioned patent to Craft. The extension 20 of the lever 21 is moved and set in such position by the coin, if it be of the proper denomination, that the stop 15 is withdrawn from the coin chute. Hence the coin in passing to the coin receptacle 16 falls upon the end of the lever 9 and releases the catch 10 from engagement with the end of the lever 11, thus permitting the spring 13 to close contact with the spring 14. The carrier 1 upon its return to its initial position closes the contact 52. A signaling circuit is thus closed from the grounded central battery B, through the line relay R, limb L of the line, to the branch including the coin apparatus, the circuit of said branch being completed through contact 52, point 53, coils 54, 55, of the electromagnet 23, point 56, contacts of springs 14 and 13, point 57, to ground at G. The line lamp $l$ is thus lighted in a manner well understood. The electromagnet 23 is so constructed that the flow of current from the battery B is not sufficient to operate the armatures of said electromagnet.

In case a toll connection is desired, the coin used to signal the central office is returned, and the toll operator subsequently informs the calling party the amount of coins required to obtain such connection. Since the coin initially deposited to signal the central office is returned, it is immaterial what denomination is employed for such purpose, and hence I preferably provide notches on the plate 18 that will permit the stop 15 being withdrawn if any one of several different denominations of coins are used, as, for example, if either a nickel, a dime or a quarter is employed. The annoyance of having to provide one particular character of coin in order to signal the central office for a toll connection is thus obviated.

The coin or coins employed in payment of the toll connection are deposited in the coin cup 16. The amount of toll deposited is made known to the toll operator in the manner set forth in the before-mentioned patents. The coin or coins in passing through the coin chute 5 operate the lever 9 from which it results that the contacts of springs 13 and 14 are closed.

The operator will send current of such polarity through the electromagnet 23 as will deposit the coins in the cash box or refund them to the subscriber, according to whether or not the desired connection is secured. The structure and circuit arrangement by which the refunding and the depositing operations are performed are important features of my invention, and hence will now be more fully set forth.

By operating the deposit key K or the refund key K¹, current of negative or positive polarity, respectively, is sent from a suitable source G¹, G², over the tip side of the cord circuit and line. The current thus flows from ground at the central office, over the line L, through the circuit hereinbefore described as closed in signaling the central office. This current flow is of sufficient strength to operate the armature 43, which is under the influence of the permanent magnet 44. Said armature in its operation short circuits one or the other of the coils 54, 55.

We will assume that the operator presses the key K, and sends over the line current of a polarity which will tilt the armature 43 in the direction indicated by the arrow $x$. When the armature is so tilted the stud 47 carried thereby operates the spring 48 so that it closes contact with the spring 50. A short circuit of the winding 55 is thus closed, such short circuit extending from the point 58 through the closed contact springs 48, 50, to the point 57. The path of current flow is now as follows: from the generator G¹, one side of which is grounded, over the line L, through contact 52, point 53, winding 54, point 58, springs 48, 50, point 57, to ground. Practically all of the magnetic flux now passes through the core of active coil 54, thereby producing sufficient power to operate the lower armature 32, which is not appreciably under the influence of the permanent magnet 44, in the direction indicated by the arrow $x$. The armature 32 when so tilted swings the arm 31 in a direction to release the gate 28, and thereby deposit the coins in cash box. In a similar way the coins held in the cup 16 may be deposited by operating the key K¹, in which case the current is of such polarity as to tilt the armature 43 in the direction indicated by the arrow $y$. The resulting release of spring 48 permits said spring to close contact with the spring 51, and also to close contacts of springs 49, 50, thus short circuiting the coil 54. The flow of current is now as follows: from the generator G², one side of which is grounded, over line L through contact 52, point 53, springs 51, 48, point 58, coil 55, point 56, springs 49, 50, to ground. Practically all of the magnetic flux now passes through the core of the coil 55, thereby producing sufficient power to operate the armature 32 in the direction indicated by the arrow $y$. The armature 32 when so tilted swings the arm 31 in a direction to cause the coins in the cup 16 to be released in the refund chute.

In whichever direction the armature 32 swings, the looped extension 40 thereof resets the lever 11 in engagement with the catch 10 and thus opens the contacts of the springs 13 and 14. Upon the release of the key K or K¹, and the resultant deënergization of the electromagnet 23, the restoring springs return the armatures 43 and 32 to their normal positions.

While I have shown and described my invention as embodied in coin actuated apparatus, it is obvious that certain features thereof may be embodied in other types of telephone toll-mechanism. It is further obvious that the sub-combination consisting of the electromagnet which I employ for controlling the release of the coin into the cash box or into the refund tray, is capable of advantageous use in other combinations.

I claim:

1. In a toll-mechanism for a telephone system, the combination with a lever arranged to be operated in initiating a call, contacts controlled by said lever, an electromagnet and a circuit therefor controlled by said contacts, an armature for said electromagnet, means for impressing on said circuit a current adapted to operate said armature, a second armature for said electromagnet responsive upon the operation of the first-named armature, a lever operated by said second armature, and means actuated by said lever for controlling the charging of the call.

2. In a toll-mechanism for a telephone system, the combination with a lever arranged to be operated in initiating a call, contacts controlled by said lever, an electromagnet and a circuit therefor controlled by said contacts, a polarized armature for said electromagnet, means for impressing on said circuit a current of either positive or negative polarity, contacts controlled by said armature for short circuiting one or the other of said coils according to the direction in which said armature moves in response to said current, a non-polarized armature mounted in position to be operated by said electromagnet when one of the coils thereof is short circuited, and means actuated by said non-polarized armature for controlling the charging of the call.

3. In a toll-mechanism for a telephone system, the combination with a lever arranged to be operated in initiating a call, contacts controlled by said lever, a polarized electromagnet and a circuit therefor controlled by said contacts, an armature mounted in proximity to the permanent magnet of said electromagnet, means for impressing on said circuit a current of either positive or negative polarity, as desired, a second armature for said electromagnet mounted out of the active field of the permanent magnet, means controlled by the actuation of said first-mentioned armature for increasing the pull in the one or the other direction of said second armature, and means actuated by said second armature in its movement in the one or the other direction for controlling the charging of the call.

4. In a toll-mechanism for a telephone system, the combination with a lever arranged to be operated in initiating a call, contacts controlled by said lever, a polarized electromagnet and a circuit therefor controlled by said contacts, an armature mounted in proximity to the permanent magnet of said electromagnet, means for impressing on said circuit a current of either positive or negative polarity, contacts controlled by said armature for short circuiting one or the other of said coils according to the direction in which said armature moves in response to said current, a second armature for said electromagnet mounted out of the active field of the permanent magnet, and means actuated by said second armature in its movement in the one or the other direction for controlling the charging of the call.

5. In a toll-mechanism for a telephone system, the combination with a lever arranged to be operated in initiating a call, contacts controlled by said lever, a polarized electromagnet and a circuit therefor, said electromagnet consisting of two parallel, coil wound cores connected by a yoke and having a permanent magnet secured to the yoke and extending to the forward end of the cores, a centrally pivoted armature mounted in proximity to the end of the permanent magnet, a second centrally pivoted armature for said electromagnet, said latter armature being mounted out of the active field of the permanent magnet, contacts arranged to be actuated by the first-named armature to short circuit one or the other of the coils of said electromagnet, means for impressing on said circuit a current of either positive or negative polarity to actuate the armature which is under the influence of the permanent magnet, and thus to bring about the actuation of said other armature, a lever actuated by said latter armature, and means actuated by said lever for controlling the charging of the call.

6. In a telephone register system, an electric circuit, a polarized electromagnet in said circuit consisting of two parallel coil-wound cores connected by a yoke and having a permanent magnet secured to the yoke and extending to the forward end of the cores, two centrally pivoted armatures mounted one above the other at the front end of said electromagnet, contacts arranged to be actuated by one of said armatures to short-circuit one or the other of the coils of said electromagnet, said other armature being responsive to the magnetic field set up by the active coil, and means controlled by said latter armature for regulating the charging of the call.

7. In a telephone register system, an electric circuit, a polarized electromagnet in said circuit consisting of two parallel coil-wound cores connected by a yoke and having a permanent magnet secured to said yoke and extending between and above said cores to their forward ends, two centrally pivoted armatures for said electromagnet, one of said armatures being mounted in and the other being mounted out of the active field of said permanent magnet, contacts arranged to be actuated by the former armature to short-circuit one or the other of the coils of said electromagnet and thus to bring said latter armature under the predominating influence of the magnetic flux from the core containing the active coil, and means controlled by said latter armature for regulating the charging of the call.

8. The combination with a polarized electromagnet consisting of two parallel, coil wound cores connected by a yoke and having a permanent magnet secured to the yoke and extending to the forward end of the cores, of a centrally pivoted armature mounted in proximity to the end of the permanent magnet, a second centrally pivoted armature for said electromagnet, said latter armature being mounted out of the active field of the permanent magnet, and contacts arranged to be actuated by the first-named armature to short circuit one or the other of the coils of said electromagnet.

9. The combination with a polarized electromagnet consisting of two parallel, coil wound cores connected by a yoke and having a permanent magnet secured to the yoke and extending to the forward end of the cores, of two centrally pivoted armatures mounted one above the other at the front end of said electromagnet, and contacts arranged to be actuated by one of said armatures to short circuit one or the other of the coils of said electromagnet, said other armature being responsive to the magnetic field set up by the active coil, and mechanism actuated by said latter armature.

10. The combination with a polarized electromagnet consisting of two parallel, coil wound cores connected by a yoke and having a permanent magnet secured to said yoke and extending between and above said cores to their forward ends, of two centrally pivoted armatures for said electromagnet, one of said armatures being mounted in and the other being mounted out of the active field of said permanent magnet, and contacts arranged to be actuated by the attraction of the former armature to short circuit one or the other of the coils of said electromagnet, and thus to bring said latter armature under
5 the predominating influence of the magnetic flux from the core associated with the active coil.

In witness whereof, I hereunto subscribe my name this 8th day of December A. D., 1908.

AMOS F. DIXON.

Witnesses:
J. ROSS SMITH,
JOHN N. REYNOLDS.